April 17, 1945.  S. F. SOUCIE  2,373,716
APPARATUS FOR BLOCKING ROW CROPS
Filed July 6, 1942  3 Sheets-Sheet 1

Fig.-1-

SYLVESTER F. SOUCIE
INVENTOR.

BY *H. A. McGrew*
ATTORNEY

April 17, 1945.    S. F. SOUCIE    2,373,716
APPARATUS FOR BLOCKING ROW CROPS
Filed July 6, 1942    3 Sheets-Sheet 2

SYLVESTER F. SOUCIE
INVENTOR.

BY
ATTORNEY

April 17, 1945.   S. F. SOUCIE   2,373,716
APPARATUS FOR BLOCKING ROW CROPS
Filed July 6, 1942   3 Sheets-Sheet 3

SYLVESTER F. SOUCIE
INVENTOR.

BY *H. A. McGrew*
ATTORNEY

Patented Apr. 17, 1945

2,373,716

UNITED STATES PATENT OFFICE 2,373,716

APPARATUS FOR BLOCKING ROW CROPS

Sylvester F. Soucie, Proctor, Colo.

Application July 6, 1942, Serial No. 449,861

11 Claims. (Cl. 97—16)

This invention relates to apparatus for blocking field crops and particularly row crops such as sugar beets, cotton and the like.

Crops of this type are frequently planted, cultivated and harvested by apparatus attached to and transported on a row crop tractor. Tractors of this type are so constructed that both the front and back wheels will travel between crop rows without damage to the growing crop.

Various types of planting, cultivating and harvesting apparatus have been devised for attachment to row crop tractors. The present invention also has been devised for use with row crop tractors although other types of propulsion may be utilized as well.

It is an object of the present invention to provide simple, efficient and durable apparatus for blocking row crops, particularly sugar beets.

Another object of the invention is to provide a selective control of the cutting action in such an apparatus.

A further object of the invention is to provide a uniform cutting operation variable at the will of the operator, but independent of the rate of propulsion of the apparatus by which such cutting action is performed.

Other objects reside in novel combinations and arrangements of parts, all of which will appear more fully in the course of the following description.

To afford a better understanding of the invention, reference will be made to the accompanying drawings in the several views of which like parts have been designated similarly, and in which.

Figure 1:
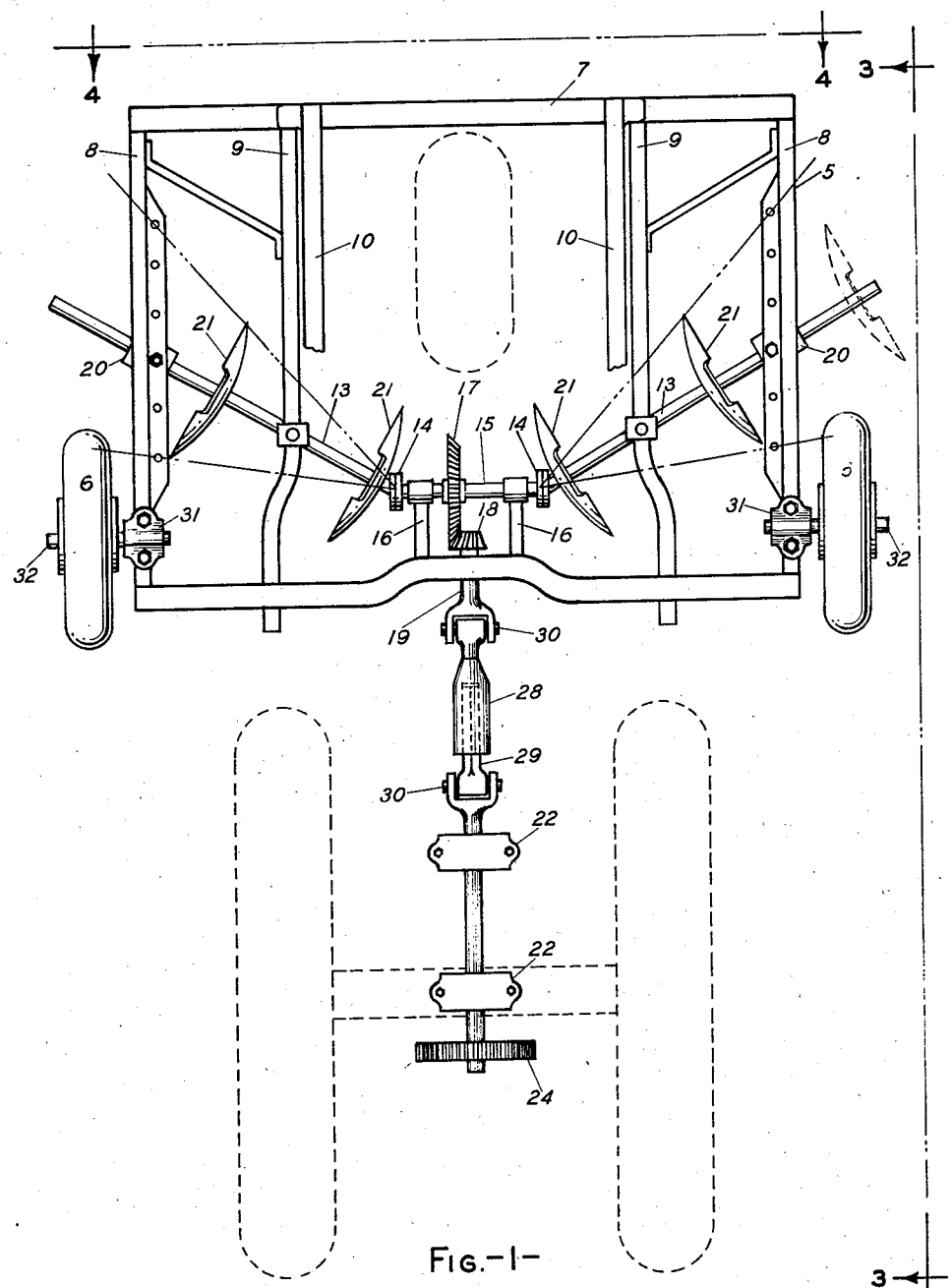
Figure 1 is a top plan view of apparatus embodying features of the present invention with the tractor position relative thereto being indicated in dotted lines.

Referring first to Figure 1, the apparatus comprises a frame 5, preferably supported for movement by wheels 6. This frame has end members 7 suitably connected by side members 8, which are further held in rigid relationship by braces 9.

Figure 3:
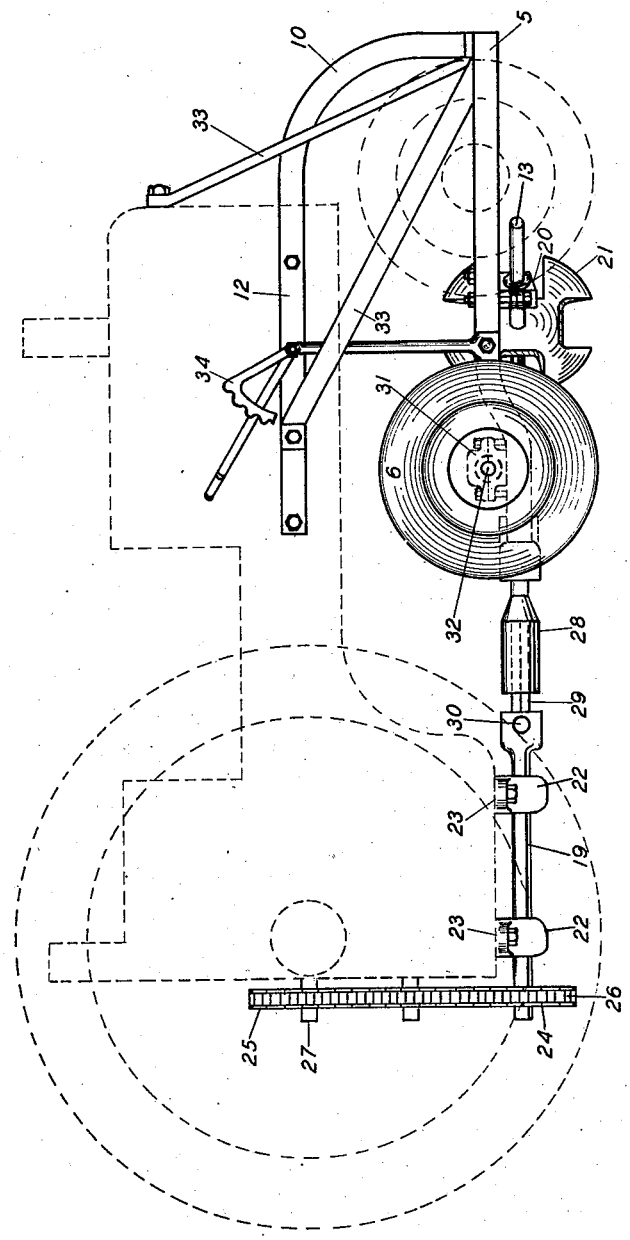
Figure 3 is a side elevation of the apparatus shown in Figure 1, with the tractor position also shown in dotted lines.

The frame 5 is adapted for attachment to a tractor (dotted line representation) by the provision of brackets 10 which extend from the front end bar 7 of frame 5 to a point of connection with the tractor as indicated at 12 in Figure 3.

Mounted on frame 5 are two rotary shafts 13, connected by flexible joints 14 with a common drive shaft 15, suitably supported from frame 5 as indicated at 16. The shaft 15 supports a gear 17 in mesh with a pinion 18 carried at the end of a shaft 19. By this arrangement rotation of shaft 19 is transmitted to rotate the two shafts 13.

Each of the shafts 13 adjacent its outer end is supported on one of the side members 8 by a movable journal box 20, which is designed to permit changes in elevation of the ends of shafts 13, as well as to change the angular position of said shafts on frame 5, as indicated by the dotted line representation in Figure 1.

Mounted on the respective shafts 13 for conjoint rotation therewith are a plurality of cutters 21, here shown as two in number, but which may be three if desired, as indicated by the dotted line representation in Figure 1. Each of said cutters comprises a dish shaped blade of the type illustrated in Figure 2, the details of which will be explained hereinafter.

Shaft 19 is journalled in bearings 22 which are fastened on the tractor and held against movement thereon as indicated at 23 in Figure 3. Rotation of shaft 19 is effected by means of a sprocket 24 carried at its rear end and driven by another sprocket 25 with which it is connected by a chain 26, carried on the end of a drive shaft 27 of a prime mover, in this instance being the motor of the row crop tractor previously referred to.

To accommodate relative movement between the tractor and frame 5 the shaft 19 preferably is lengthwise extensible through the provision of an expansion joint formed by a female member 28 having a square interior socket portion in which a male member 29 of square section is fitted. Each end of said expansion joint is pivotally connected with the two extremities of shaft 19 as indicated at 30 in Figure 1. In this way either horizontal or vertical changes in position can be accommodated without impeding the rotation of shaft 19.

The wheels 6 supporting frame 5 are of a diameter calculated to maintain blades 21 at the desired elevation with respect to the surface over which they move. However, varying requirements of the crop being cultivated, and in the size of the blades 21 due to wear, necessitates changed position of frame 5 if the apparatus is to function efficiently and for this reason, wheels 6 are journalled on frame 5 in blocks 31 which provide vertical adjustment of the axles 32 on which said wheels 6 are mounted.

Additional stability is given to the frame 5 when mounted on a tractor by braces 33 held on the tractor at the positions shown in Figure 3 and which cooperate with a lifting mechanism 34 to permit raising of the cutters 21 out of operative position at the end of rows, or in avoiding obstacles.

Figure 2:
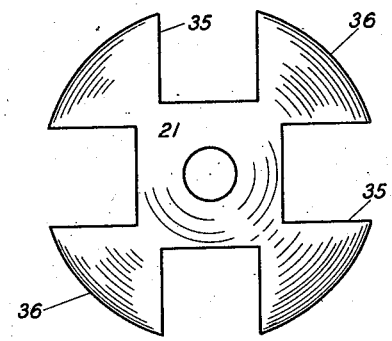
Figure 2 is a top plan view of a single cutter of the type illustrated in Figure 1 and drawn to an enlarged scale.
Figure 4:
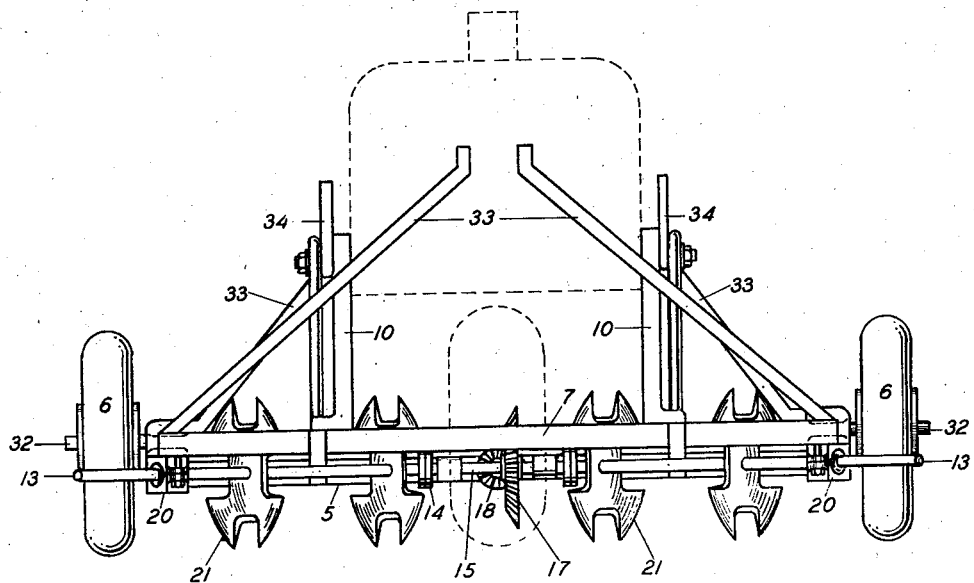
Figure 4 is a front elevation of the apparatus illustrated in Figure 1, with the tractor position again shown in dotted lines.

As best shown in Figure 2, the cutters 21 comprise dished disks having a series of slots 35 at intervals about their peripheries, here shown as four in number. The slotted portions 35 are of sufficient depth to insure against damage to the portion of the crop over which they pass in the rotation of cutters 21. The peripheral portions 36 between slots 35 are of a size calculated to remove that portion of the row crop which is to be eliminated to provide the proper spacing between the untouched portions over which the slots 35 pass.

In operation, the device is attached to a row crop tractor so that it is suspended on the lower side thereof in the manner illustrated in Figures 1 and 3. A preliminary setting of journal boxes 20 determines the operative elevation of cutters 21 and also adjusts the angle of the shafts to make the effective spacing of the cutters the same as that of the crop rows to be blocked. Similarly, blocks 31 are set to determine the position of frame 5 on its wheel support.

The operator drives the tractor along crop rows such as a beet field, for example, with each wheel of the tractor travelling between adjoining rows. This positions each of the respective cutters 21 in alinement with one crop row and at an acute angle to the direction of the row and as the tractor moves through the field, the respective cutting portions 36 of cutters 21 engage the growing crop at intervals and cut the contacted portions as well as moving same laterally in the rotation of the blades.

Due to the positive drive of the blades provided in the present apparatus, a uniform cutting action and cutting interval is attained. Preferably, the initial arrangement of the power take-off control causes the blades to rotate slightly faster than the normal speed of the vehicle so that the cutting action is induced primarily by the rate of rotation of shafts 13 rather than the speed of the vehicle on which frame 5 is mounted.

However, under some conditions the best results will be attained by having the cutters rotate at a rate slower than the movement of the vehicle and thus incorporate a dragging component in the cutting action. All of such adjustments of the present apparatus may be made to satisfy individual requirements.

When the tractor reaches the end of the rows through which it is moving, the lifting mechanism 34 may be operated to raise frame 5 until the tractor is turned and enters a new series of rows. Thereupon the frame is lowered and the next cutting action begins.

At any time a variation in the width of rows is encountered, the angular position of the cutters 21 may be changed by adjusting boxes 20 on frame 5 and in this way the distance between laterally-adjoining cuts is varied.

In all the aforesaid operations the portions of the crop which it is desired to have removed are first cut and then elevated and forced laterally by the progressive rotation of the blades or cutters 21.

The device illustrated in the drawings is specially designed for use with row crop tractors, but it will be apparent that the apparatus of the present invention also may be built for horse-drawn operation where desired. In such a case, the axles 32 would extend across frame 5 between side members 8 and a sprocket mounted centrally thereon would drive a second sprocket on shaft 15 through the intermediary of an endless chain.

If desired, a slip clutch may be incorporated in line shaft 19, preferably at expansion joint 28, and in this way relieve any undue stresses placed on shafts 13 and blades 21, in the event the blades become fouled by foreign objects.

Changes and modifications may be availed of within the spirit and scope of the invention as defined in the hereunto appended claims.

What I claim and desire to secure by Letters Patent is:

1. A device of the character described, comprising a frame having means for its attachment to a self-propelled vehicle, a plurality of rotary disk cutter blades mounted at intervals across said frame corresponding to the spacing of crop rows, each said blade having spaced cutting surfaces for intermittent cutting of a row crop along which it is moved and being arranged to rotate in a plane at an acute angle to the crop row, and power-transmission means associated with said blades and adapted to be driven by the prime mover of the vehicle for rotating said blades independently of the rate of movement of the vehicle whereby the cut-out portions of the crop rows are moved laterally into the spaces between the rows.

2. A device of the character described, comprising a frame having means for its attachment to a self-propelled vehicle, a plurality of laterally-ranging shafts on said frame, a plurality of disk cutters held on each shaft for conjoint rotation therewith and spaced at intervals along said shaft corresponding to the spacing of crop rows, said cutters having their cutting surfaces arranged for intermittent contact with a row crop along which the frame is moved and being arranged to rotate in planes at acute angles to the crop rows, means including a train of gears for synchronizing rotation of said shafts, and means for transmitting power from the prime mover of the vehicle to said train of gears.

3. A device of the character described, comprising a frame having means for its attachment to a self-propelled vehicle, a plurality of power-driven, rotary cutter blades mounted at intervals across said frame and angularly movable to different positions on said frame corresponding to spacing variations in the crop rows, and means for so changing the angular position of said cutters.

4. A device of the character described, comprising a wheel-supported frame having means for its attachment to a self-propelled vehicle and its suspension beneath the vehicle, a plurality of substantially horizontal rotary shafts extending laterally of the frame, a plurality of cutters spaced to correspond with crop row spacing and held on each shaft for conjoint rotation therewith, means for adjusting said shafts angularly to change the effective cutting position and spacing of said cutters, and a common driving means for synchronized rotation of said shafts.

5. A device of the character described, comprising a wheel-supported frame having means for its attachment to a self-propelled vehicle and its suspension beneath the vehicle, a plurality of rotary shafts extending laterally of the frame, a plurality of spaced cutters held on each shaft for conjoint rotation therewith and spaced to correspond to crop row spacing, a common driving means for synchronized rotation of said shafts, said means including a train of gears in power-transmitting connection with said shafts, a third shaft in driving connection with said train of gears, and means driven by the prime mover of the vehicle for rotating said third shaft.

6. A device of the character described, comprising a frame having means for its attachment to a self-propelled vehicle, a substantially horizontal shaft rotatably mounted on said frame and extending laterally thereof, a plurality of dished disks mounted on said shaft and spaced at intervals corresponding to crop row spacing, each of said disks having at least one slot in its periphery to provide intermittent cutting action for blocking a row crop, and power transmitting means connecting said shaft to be driven by the prime mover of the vehicle for rotating said disks at speeds different from the rate of rotation initiated by the rate of travel of said frame and thereby cutting out intermittent portions of the crop rows and moving the cut-out portions of the rows laterally into the spaces between the rows.

7. A device of the character described, comprising a frame having means for its attachment to a self-propelled vehicle, a substantially horizontal shaft extending laterally of said frame, a plurality of cutting disks secured on said shaft and spaced at intervals corresponding to the spaces between crop rows, the periphery of each of said disks having a cutting portion and a slot portion for cutting out spaced portions of a crop row, means for adjusting said shaft to different angular positions corresponding to different row spacings, and means for connecting said shaft to be driven by the prime mover of the vehicle.

8. In a device of the character described, a wheel supported frame having means for its attachment to a source of motive power, a rotatable shaft mounted laterally of said frame and having a plurality of spaced cutter blades secured thereto for rotation therewith, means for varying the position of said shaft vertically with respect to said frame, means for varying the angular position of said shaft with respect to said frame, and means for varying the elevation of said frame on its wheel support to change the effective cutting depth of said blades.

9. In a device of the character described, a wheel supported frame having means for its attachment to a source of motive power, a substantially horizontal rotary shaft extending laterally of said frame, a plurality of cutters spaced to correspond with crop row spacing and secured to said shaft for rotation therewith, means for adjusting said shaft angularly to change the effective lateral spacing of said cutters, and means for adjusting the vertical height of said shaft near one end thereof.

10. A device of the character described, comprising a frame having means for its attachment to a self-propelled vehicle, a plurality of rotary cutter blades having spaced cutting surfaces for intermittent cutting of a row crop and mounted across said frame at intervals corresponding to the spacing of crop rows, and power transmission means associated with said blades and adapted to be driven by the prime mover of the vehicle for rotating said blades differentially from the rate of rotation initiated by the rate of travel of said frame.

11. A device of the character described, comprising a frame having means for its attachment to and beneath a self-propelled vehicle, a plurality of rotary shafts extending laterally of the frame and movable to different angular positions with respect to said frame, a plurality of dished discs mounted on each shaft and spaced at intervals corresponding to crop row spacing, each of said discs having at least one slot in its periphery to provide intermittent cutting action for blocking a row crop, means for varying the elevation of said frame to change the effective cutting depth of the discs, and power transmission means driven by the prime mover of the vehicle and operably connected with said shafts for effecting rotation of said discs.

SYLVESTER F. SOUCIE.